Aug. 21, 1956 C. A. URBAN 2,759,287
NON-FREEZE TIP-UP
Filed June 14, 1954
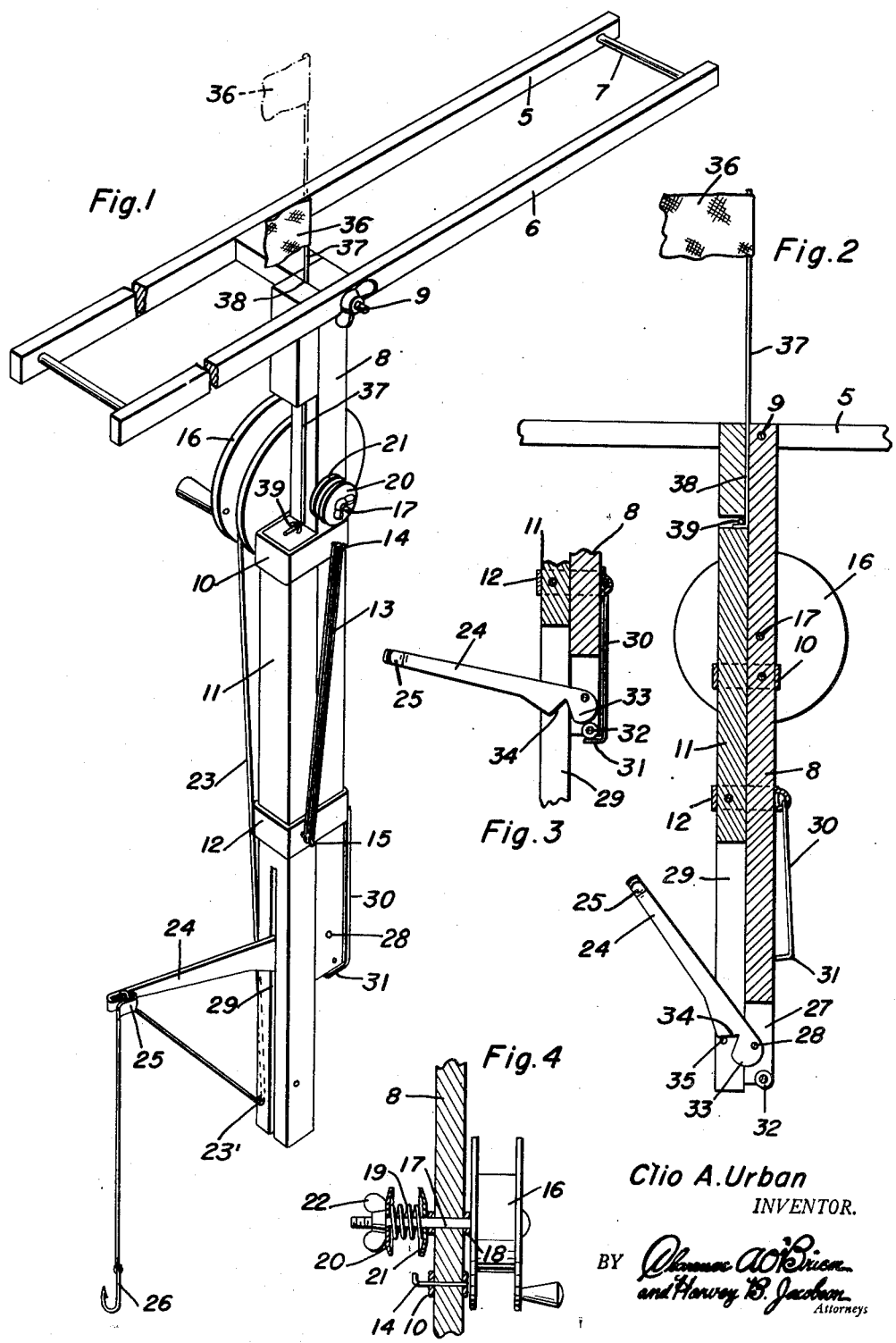
Clio A. Urban
INVENTOR.

United States Patent Office 2,759,287
Patented Aug. 21, 1956

2,759,287

NON-FREEZE TIP-UP

Clio A. Urban, Plainfield, Wis.

Application June 14, 1954, Serial No. 436,549

2 Claims. (Cl. 43—16)

The present invention relates to new and useful improvements in ice fishing apparatus for unattended fishing in a hole in the ice and usually referred to in the trade as a tip-up.

An important object of the invention is to provide a fishing apparatus including means for supporting a line and reel below the surface of the water while fishing through a hole in ice, together with a signal flag held in a lowered position by a trip mechanism and actuated through the medium of a fish pulling on the line to raise the flag.

Another object is to provide a fishing apparatus of this character including means for setting the hook in the mouth of the fish when the latter strikes the bait.

A still further object of the invention is to provide an apparatus of this character of simple and practical construction, which is efficient and reliable in operation, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a vertical sectional view showing the trip mechanism in released position to raise the signal flag and set the hook;

Figure 3 is a fragmentary vertical sectional view showing the trip mechanism in set position; and Figure 4 is a fragmentary vertical sectional view of the tension adjusting means for the reel.

Referring now to the drawing in detail, wherein for the purpose of illustration, I have disclosed a preferred embodiment of the invention, which has to do with a common bridge-like frame characterized by a pair of horizontal supporting rails 5 and 6 adapted to rest on the surface of ice in a position over a hole therein, said rails being rigidly connected to each other by means of cross-bars 7 at each end thereof.

A vertical rod 8 is secured at its upper end portion between the rails 5 and 6 by means of a bolt and wing nut 9 to extend downwardly through the hole in the ice into the water.

A metal band 10 is secured to the rod 8 adjacent the upper portion of the latter to form an upper guide for a second vertically slidable rod 11 which is positioned in parallel relation to the rod 8 at one side of the latter. A lower metal band 12 is secured to the slidable rod 11 and is slidable on the lower portion of the stationary rod 8 to maintain the rod 11 in an upright position during sliding movement thereof. An elastic band 13 or similar resilient member is attached at its upper end to the stationary band 10 by means of a hook or the like (see Fig. 4), and the elastic band is attached at its lower end to the lower metal band or guide 12 by means of a hook or the like 15.

A fishing reel 16 is rotatably mounted on a bolt 17 which is supported transversely at the upper portion of the stationary rod 8, and a washer 18 is positioned between the reel 16 and the adjacent side of the rod 8, and against which the reel is frictionally held by means of a coil spring 19 mounted on the bolt at an opposite side of the rod 8 and tensionally adjusted between a pair of disks 20 and 21 by a thumb nut 22 threaded on the bolt.

A fishing line 23 is attached to the reel 16 for reeling thereon, and the line extends downwardly and slidably engages a suitable guide 23' at the lower portion of the slidable rod 11. The lower portion of line 23 is attached to the outer end of a trigger arm 24 by means of a resilient clip 25 and from which the line is suspended with the hook 26 at the lower end thereof. The trigger arm 24 is pivoted at its inner end in a vertical slit 27 in the lower portion of stationary rod 8 by means of a transverse pin 28 and the trigger arm is vertically swingable in a vertical slot 29 in the lower portion of slidable rod 11.

The slidable rod 11 is locked in its lower set position by means of an L-shaped catch 30 which is pivoted to the metal band 12 and extends downwardly therefrom at the adjacent side of the stationary rod 8 and the catch is formed with an inwardly projecting hook 31 at its lower end adapted for engaging under a roller 32 which is rotatably supported in the slot 27 of stationary rod 8 in a manner to facilitate releasing movement of the catch.

The pivoted end of trigger arm 24 is formed with a cam 33 which rides against the catch 30 upon a lowering movement of the arm to release the catch. Trigger arm 24 is also formed at its lower edge with a V-shaped notch 34 in which a pin 35 in the lower portion of slot 29 in sliding rod 11 is adapted to enter upon a raising movement of said rod to swing arm 24 upwardly when the pin 35 strikes one of the upwardly converging edges of the notch.

A signal flag 36 includes a vertical staff 37 which is slidable in a vertical opening or groove 38 in the upper portion of stationary rod 8. The lower end of flag staff 37 is attached to the top of sliding rod 11 by a staple or other suitable fastener 39.

In the operation of the device, the rails 5 and 6 are placed on the ice and the rods 8 and 11 are supported in an opening (not shown) in the ice in the water to prevent freezing of the reel and line. The sliding rod 11 is pulled downwardly against the tension of the elastic band 13 and locked in the lowered position by engaging catch 30 under roller 32 at the lower end of stationary rod 8. The fishing line 23 is then engaged in the clip 25 at the outer end of trigger arm 24 and slack in the line is taken up by the reel. The arm 24 is held in a horizontal position by engagement of cam 33 at the inner end of the arm with the catch 30.

A relatively slight pull on the line 23 by a fish will pull the arm 24 downwardly to release catch 30 and the elastic band 13 will then pull the rod 11 upwardly and cause the pin 35 to enter notch 34 in the trigger arm to swing the arm upwardly and set the hook 26 in the mouth of the fish. At the same time, the flag 36 will be raised to call attention of the fisherman thereto.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. For use when fishing through a hole in an ice covered body of water, a non-freezing tip-up comprising, in combination, a generally rectangular horizontal bridge-like frame embodying spaced parallel coplanar rails adapted to rest atop the ice and to bridge the usual fishing hole which is formed in the ice, and non-freeze means attached to and depending from the central portion of said frame and adapted to descend into the water by way of the stated hole in the ice, said means comprising a stationary vertical rod, a vertically slidable rod having upper and lower assembling bands slidingly embracing the stationary rod, a signalling flag carried at the upper end of said slidable rod, resilient means carried by said assembling bands and connecting the rods to each other and urging the slidable rod upwardly, an L-shaped catch pivotally mounted on the lower band having a free end releasably engaging the lower end portion of the stationary rod to temporarily fasten the slidable rod in a lowered position on said stationary rod, a reel mounted for rotation on said stationary vertical rod, a fishing line attached to said reel and also attached to said vertically slidable rod, and a trigger arm pivotally mounted on said stationary vertical rod extending through a slot provided therefor in the lower end portion of said slidable rod, and connected to the fishing line and actuated by a fish pulling on the line in a manner to release the catch.

2. For use when fishing through a hole in an ice covered body of water, a non-freeze tip-up comprising, in combination, a horizontal bridge-like frame adapted to rest atop the ice and to bridge the usual fishing hole in the ice, and non-freeze means attached to and adapted to depend below the plane of said frame and adapted to extend downwardly through the fishing hole and into the water beneath the ice, said means comprising a stationary vertical rod, a vertically slidable rod carried by the stationary rod, a flag carried at the upper end of said slidable rod, resilient means connecting the rods to each other and urging the slidable rod upwardly, a catch carried by the slidable rod and having a free end portion engaging the lower end portion of the stationary rod to lock the slidable rod in a lowered position, a fishing line reel mounted for rotation on said stationary rod, a fishing line attached at one end to said reel and having its opposite end slidably connectible with the lower end of said slidable rod, a vertically swingable trigger arm pivoted to the stationary arm and to which the line is connected for actuating the trigger arm by a fish pulling on the line, a cam on the trigger arm engaging said catch to release the catch upon a downward movement of the trigger arm, and means carried by the slidable rod and engaging the trigger arm upon upward movement of the slidable rod to swing the trigger arm upwardly in a fish hook setting movement.

References Cited in the file of this patent
UNITED STATES PATENTS

| | | |
|---|---|---|
| 2,439,451 | Clark | Apr. 13, 1948 |
| 2,523,927 | Stallings | Sept. 26, 1950 |
| 2,590,721 | Muth | Mar. 25, 1952 |
| 2,654,338 | Deal | Oct. 6, 1953 |
| 2,693,046 | Langevin | Nov. 2, 1954 |